US008561108B2

(12) United States Patent
Bhogal et al.

(10) Patent No.: US 8,561,108 B2
(45) Date of Patent: Oct. 15, 2013

(54) VIDEO EPISODE ORDER ADHERENCE

(75) Inventors: Kulvir S. Bhogal, Fort Worth, TX (US); Gregory J. Boss, American Fork, UT (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 12/054,982

(22) Filed: Mar. 25, 2008

(65) Prior Publication Data
US 2009/0249397 A1 Oct. 1, 2009

(51) Int. Cl.
H04H 60/33 (2008.01)
G06F 3/00 (2006.01)
H04N 5/76 (2006.01)

(52) U.S. Cl.
USPC .............. 725/46; 725/9; 725/58; 386/296; 386/297

(58) Field of Classification Search
None
See application file for complete search history.

(56) References Cited

U.S. PATENT DOCUMENTS

| | | | |
|---|---|---|---|
| 5,978,766 A | 11/1999 | Luciw | |
| 6,088,722 A | 7/2000 | Herz et al. | |
| 6,351,596 B1 | 2/2002 | Ostrover | |
| 6,601,074 B1 | 7/2003 | Liebenow | |
| 6,614,987 B1 | 9/2003 | Ismail et al. | |
| 6,625,503 B1 | 9/2003 | Smith | |
| 6,934,964 B1 | 8/2005 | Schaffer et al. | |
| 7,020,893 B2 * | 3/2006 | Connelly | 725/97 |
| 7,055,168 B1 | 5/2006 | Errico et al. | |
| 7,096,486 B1 | 8/2006 | Ukai et al. | |
| 7,394,967 B1 | 7/2008 | Potrebic et al. | |
| 7,570,870 B2 | 8/2009 | Ellis | |
| 7,665,111 B1 | 2/2010 | Barton et al. | |
| 7,752,643 B2 * | 7/2010 | Ito et al. | 725/50 |
| 7,870,593 B2 * | 1/2011 | Stuckman et al. | 725/142 |
| 7,877,765 B2 | 1/2011 | Bhogal et al. | |
| 7,882,528 B1 * | 2/2011 | Taylor et al. | 725/58 |
| 2001/0049824 A1 * | 12/2001 | Baker et al. | 725/109 |
| 2002/0056087 A1 | 5/2002 | Berezowski et al. | |

(Continued)

FOREIGN PATENT DOCUMENTS

JP 2003319308 11/2003

OTHER PUBLICATIONS

"U.S. Appl. No. 11/076,813 Office Action", Sep. 2, 2010, 13 pages.

(Continued)

Primary Examiner — Brian Pendleton
Assistant Examiner — Jason K Lin
(74) Attorney, Agent, or Firm — DeLizio Gilliam, PLLC

(57) ABSTRACT

Viewing episodes of a video series in order allows for a good viewing experience and understanding of episode content of the individual episodes. Functionality can be implemented in a video recording device and/or at a content provider to collect data about viewing behavior to determine if a user(s) tends to view episodes of a series in order. The video recording device and/or content provider can also keep track of partially or fully viewed episodes and episodes that are ready for viewing to avoid acquiring already viewed episodes Being able to quickly catch up on missed episodes will allow for easier introduction to a video series and prevent viewers from abandoning programs. In addition, requests for particular episodes can be leveraged for dynamic episode scheduling and dynamic setting of advertisement rates.

20 Claims, 8 Drawing Sheets

(56) References Cited

U.S. PATENT DOCUMENTS

| | | |
|---|---|---|
| 2002/0174430 A1 | 11/2002 | Ellis et al. |
| 2002/0188947 A1 | 12/2002 | Wang et al. |
| 2002/0199193 A1 | 12/2002 | Gogoi et al. |
| 2003/0190150 A1 | 10/2003 | Kawasaki et al. |
| 2003/0212708 A1 | 11/2003 | Potrebic et al. |
| 2004/0001081 A1 | 1/2004 | Marsh |
| 2004/0019906 A1 | 1/2004 | Shintani et al. |
| 2004/0091236 A1 | 5/2004 | Boston et al. |
| 2004/0111750 A1 | 6/2004 | Stuckman et al. |
| 2004/0187164 A1 | 9/2004 | Kandasamy et al. |
| 2004/0244030 A1 | 12/2004 | Boyce et al. |
| 2005/0050578 A1 | 3/2005 | Ryal |
| 2005/0060743 A1 | 3/2005 | Ohnuma et al. |
| 2005/0132400 A1 | 6/2005 | Liao et al. |
| 2005/0132401 A1 | 6/2005 | Boccon-Gibod et al. |
| 2005/0149987 A1 | 7/2005 | Boccon-Gibod et al. |
| 2006/0100987 A1 | 5/2006 | Leurs |
| 2006/0136966 A1 | 6/2006 | Folk, II |
| 2006/0140584 A1 | 6/2006 | Ellis et al. |
| 2006/0174300 A1* | 8/2006 | Gu et al. ............... 725/100 |
| 2006/0294538 A1 | 12/2006 | Li et al. |
| 2006/0294548 A1 | 12/2006 | Potrebic et al. |
| 2007/0033607 A1 | 2/2007 | Bryan |
| 2007/0079342 A1 | 4/2007 | Ellis et al. |
| 2007/0113244 A1 | 5/2007 | Verschueren et al. |
| 2007/0122108 A1 | 5/2007 | Bontempi |
| 2007/0136753 A1 | 6/2007 | Bovenschulte et al. |
| 2007/0154163 A1* | 7/2007 | Cordray ............... 386/52 |
| 2007/0157247 A1 | 7/2007 | Cordray et al. |
| 2007/0157249 A1 | 7/2007 | Cordray et al. |
| 2007/0233571 A1 | 10/2007 | Eldering et al. |
| 2007/0245378 A1 | 10/2007 | Svendsen |
| 2007/0248317 A1 | 10/2007 | Bahn |
| 2008/0066106 A1* | 3/2008 | Ellis et al. ............... 725/40 |
| 2008/0101763 A1 | 5/2008 | Bhogal et al. |
| 2008/0115166 A1 | 5/2008 | Bhogal et al. |
| 2008/0243633 A1 | 10/2008 | Spiegelman |
| 2008/0247724 A1 | 10/2008 | Potrebic et al. |
| 2009/0092183 A1 | 4/2009 | O'Hern |
| 2009/0249409 A1 | 10/2009 | Bhogal et al. |

OTHER PUBLICATIONS

"U.S. Appl. No. 12/055,031 Final Office Action", Aug. 27, 2012, 19 pages.
"U.S. Appl. No. 11/553,001 Office Action", Nov. 4, 2009, 24 pages.
"U.S. Appl. No. 11/553,001 Final Office Action", Jun. 9, 2009, 22 pages.
"U.S. Appl. No. 11/553,001 Final Office Action", Apr. 28, 2010, 31 pages.
"U.S. Appl. No. 11/553,001 Office Action", Dec. 23, 2008, 20 pages.
"U.S. Appl. No. 11/553,007 Final Office Action", Mar. 3, 2010, 11 pages.
"U.S. Appl. No. 11/553,007 Office Action", Sep. 16, 2009, 12 pages.
"U.S. Appl. No. 12/055,031 Final Office Action", Mar. 15, 2011, 12 pages.
"U.S. Appl. No. 12/055,031 Office Action", Sep. 2, 2010, 13 pages.
"U.S. Appl. No. 12/055,031 Office Action", Apr. 10, 2012, 21 pages.
Crenshaw, Bob et al., "History Assist when Selecting TV Shows", RD n446 06-2001 Article 119 http://ip.com/pdf/ipcompad/IPCOM000014540D.pdf?free=priorartdatabase Jun. 1, 2001, p. 1004.

* cited by examiner

VIDEO EPISODE ORDER ADHERENCE

BACKGROUND

Embodiments of the inventive subject matter generally relate to the field of video recording, and, more particularly, to recording video episodes based on order.

A digital video recorder (DVR) (a.k.a. personal video recorder or PVR) is a device that records audio and video content in a digital format to a disk drive or other medium. DVRs include stand-alone set-top boxes and software for personal computers, where the software enables content capture and playback to and from disk. DVRs provide convenient "time shifting" and other features, such as pausing live TV, instant replay of scenes, chasing playback, skipping advertising, etc. Most DVRs use a Motion Pictures Expert Group format for encoding video signals.

Many television programs are presented as a series of related episodes that are intended to be viewed sequentially. A viewer may want to begin watching a television series, but has missed some of the episodes. If the viewer simply begins watching episodes in the middle of the series, he or she may not fully understand the storyline.

SUMMARY

Embodiments include a method directed to identifying one or more video episodes in a series of videos as having a dependency relationship with a selected video episode in the series of videos. At least some subject matter of the selected video episode is dependent on the subject matter of the one or more video episodes. Viewing behavior data is evaluated. Data associated with a video recording device represents viewing behavior. An electronic programming guide (EPG) is searched for future broadcasts of the one or more video episodes if the viewing behavior data indicates tendency to adhere to video series order. It is determined if the one or more video episodes are available for download from one or more services. Based on configuration of the video recording device, some or all of the one or more episodes are requested from the one or more services for download to the video recording device and the video recording device is scheduled to record some or all of the one or more episodes in accordance with said searching of the electronic programming guide.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to digital video recorders and personal video recorders, embodiments can be implemented with a video game console, a portable video recording device, a computer, etc. In other instances, well-known instruction instances, protocols, structures and techniques have not been shown in detail in order not to obfuscate the description.

Viewing episodes of a video series in order allows for a good viewing experience and understanding of episode content of the individual episodes. Functionality can be implemented in a video recording device and/or at a content provider to collect data about viewing behavior to determine if a user(s) tends to view episodes of a series in order. The video recording device and/or content provider can also keep track of partially or fully viewed episodes and episodes that are ready for viewing to avoid acquiring already viewed episodes. Being able to quickly catch up on missed episodes will allow for easier introduction to a video series and prevent viewers from abandoning programs. In addition, requests for particular episodes can be leveraged for dynamic episode scheduling and dynamic setting of advertisement rates.

Figure 1:
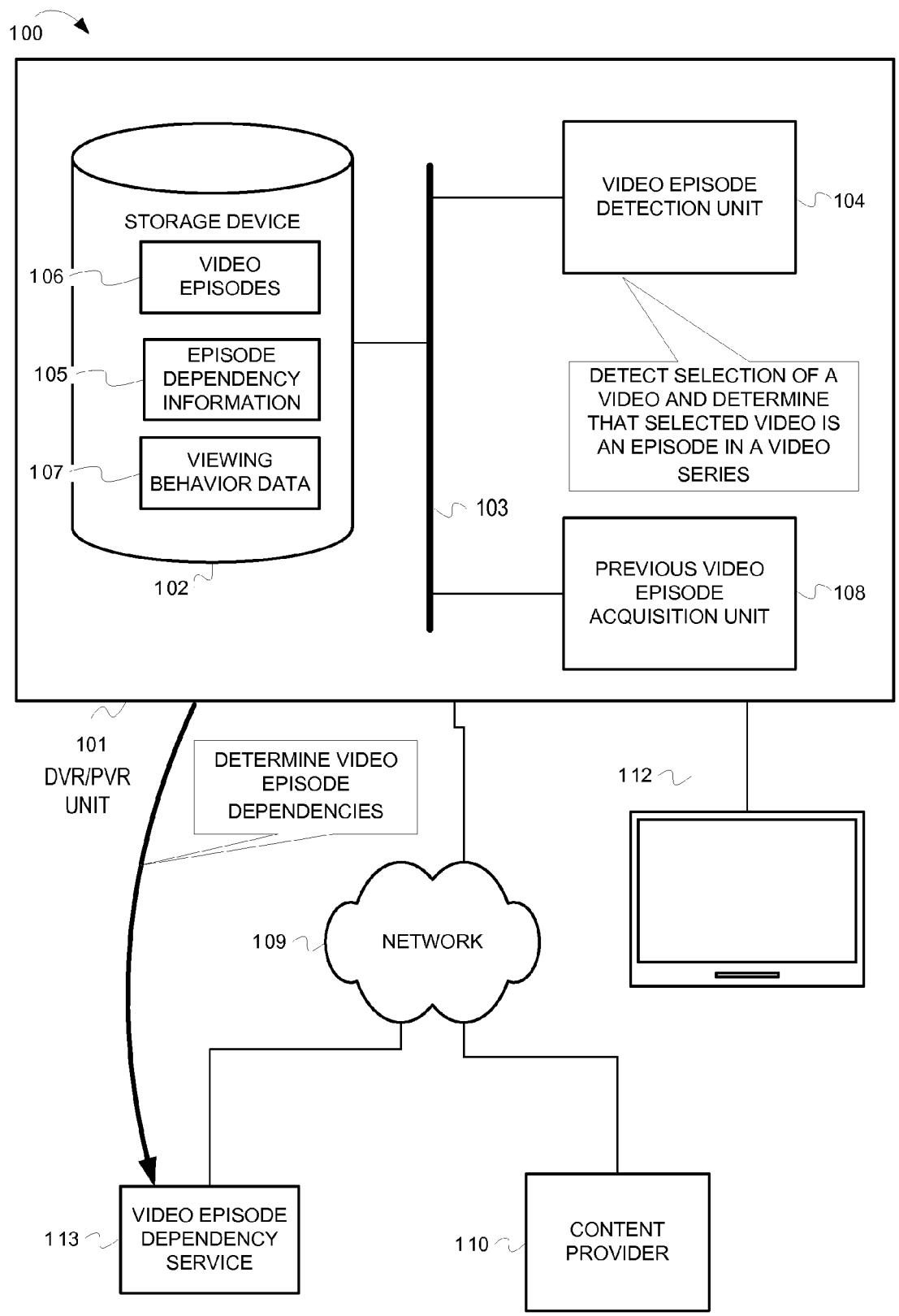
FIG. 1 illustrates an example content delivery system 100.

FIG. 1 illustrates an example content delivery system 100. The content delivery system includes a digital video recorder/personal video recorder (DVR/PVR) unit 101, display device 112 (e.g., television, monitor, projector, etc.), network 109, content provider 110, and video episode dependency service 113. The content provider 110 can provide television content via a cable television infrastructure (e.g., optical fiber, coaxial cables, etc.) or other infrastructures, such as digital subscriber lines (DSL). The DVR unit 101 includes a storage device 102, video episode detection unit 104, and previous episode acquisition unit 108, all of which are connected via a bus 103. Although FIG. 1 shows the DVR's components connected via a bus 103, the components can be connected using other technologies (e.g., software interfaces). The storage device 102 hosts video episodes 106, episode dependency information 105, and viewing behavior data 107. Although FIG. 1 shows the episode dependency information being stored locally, the episode dependency information may be stored remotely, previously retrieved from a remote source, refreshed from a remote source, etc. In this illustration, the DVR/PVR unit 101 accesses the video episode dependency service 113 to determine dependencies. For instance, the DVR/PVR unit 101 accesses the video episode dependency service 113 to determine if a selected episode 7 being broadcast or scheduled to be broadcast is dependent on information provided in one or more previous episodes. The DVR/PVR 101 can retrieve this information from the video episode dependency service 113 for plural video series or for the corresponding video series (e.g., the DVR/PVR unit 101 can fetch dependency information for only the corresponding video series or for multiple video series that include the corresponding video series as if prefetching dependency information for other video series). The DVR/PVR unit 101 stores the dependency information in the storage device 102. The DVR/PVR unit 101 can add the dependency information from the service 113 to the episode dependency information 105, partially overwrite the episode dependency information 105, or entirely overwrite the episode dependency information 105.

The video episode detection unit 104 detects selection of a video and determines if the selected video is an episode in a video series. Example techniques for determining if the selected video is an episode in a series include matching the main title of the selected video to previously aired programs, checking for an episode number and/or episode title, etc. Titles, episode numbers and other program information for a video can be obtained from an EPG, metadata associated with video episodes, data accessed over a network, and/or a third party cable service.

It is determined which, if any, video episodes in a series are dependent on previous episodes. Episodes are dependent on one another if a viewer should watch a previous episode in order to fully understand the content of a subsequent episode (e.g., television drama series, television mini-series, etc.). An episode can be dependent on all of the previous episodes, a subset of the previous episodes, or none of the previous episodes. If the selected video is an episode in a series, the video episode detection unit 104 requests episode dependency information from the video episode dependency service 113. The episode dependency information service 113 may be part of the EPG, data accessed over a network, and/or a third party cable service.

Once the episode dependencies are determined, the previous video episode acquisition unit 108 acquires any previous video episodes that have not already been watched or stored in memory. Viewing behavior data 107 is used to determine whether a user(s) associated with the DVR/PVR unit tends to view episodes of a series in order. If a user indicates (e.g., sets preference) or viewing behavior suggests that a user tends not to adhere to series order, then the DVR/PVR can prompt the user before acquiring an episode or simply not acquire the episode. The video episodes data 106 comprises recorded video episodes and indications of other information about previously viewed episodes. If an episode has been viewed or is already stored in the device, that episode will not be downloaded. The viewing behavior data 107 could be stored locally on the DVR and/or on a backend server at the content provider. In addition, the viewing behavior data 107 and the video episodes data 106 can be represented with a same set of data. For example, the DVR/PVR unit 101 can examine episodes that are currently stored to determine if the user(s) watch episodes without regard to order. In another example, the DVR/PVR unit 101 maintains a counter for dependent episodes in a video series watched without the benefit of the one or more previous episodes. In another example, the DVR/PVR unit 101 maintains a flag, perhaps for each video series, that indicate whether a user(s) has watched a dependent episode of a series without watching a previous episode.

Embodiments do not necessarily retrieve episodes automatically. A DVR/PVR unit can inform a user of dependencies and suggest a particular viewing order. For example, embodiments can display a graphical user interface that indicates selected episode 8 is dependent on episodes 7 and 5 and suggests viewing episodes 5, 7, and 8 in order. The example graphical user interface can prompt the user to direct the unit to fetch the episodes 7 and 5, select which of the previous episodes to retrieve, or to ignore the dependencies and view episode 8. Embodiments can also prevent viewing of an episode that is dependent upon a previous unviewed episode (e.g., not allow a user to view episode 8 until episodes 5 and 7 have been viewed, or at least retrieved).

Although not shown in FIG. 1, the DVR unit 101 includes components for recording and presenting content (e.g., video decoding logic, read/write logic, video turner(s), etc.). Furthermore, any of the components shown herein can include hardware, firmware, and/or machine-readable media including instructions for performing the operations described herein.

Figure 2:
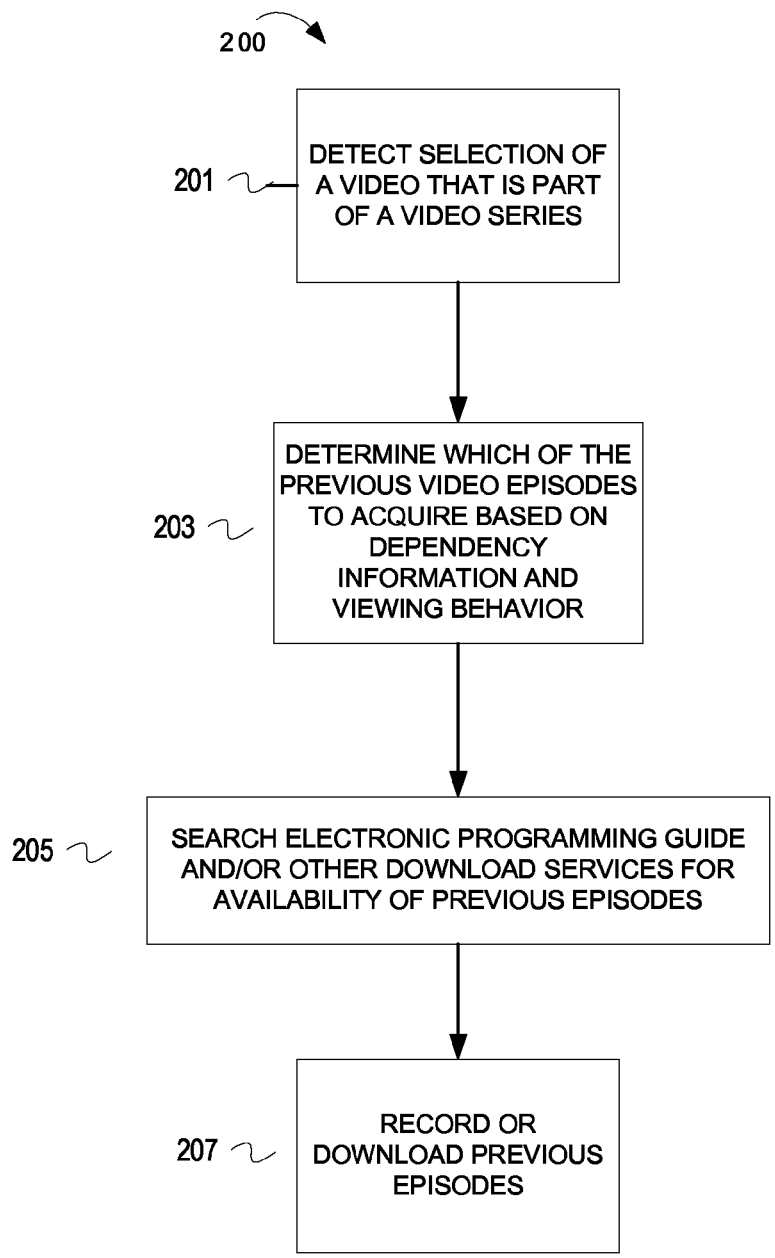
FIG. 2 depicts a flowchart of example operations to acquire previous episodes.

FIG. 2 depicts a flowchart of example operations to acquire previous episodes. Flow 200 begins at block 201, where selection of a video that is part of a video series is detected. Examples of detecting selection of a video include detecting selection of a video for live television viewing, detecting changing live television channels, detecting scheduling of a new recording of a video, etc. Data from various sources (e.g., the EPG, metadata, etc.) indicates the video is part of a series.

At block 203, episode dependency information and viewing behavior are examined to determine which previous episodes to acquire. Dependency information could be acquired from the EPG, and/or a third party service. An example of a third party service includes a service that accumulates episode dependency information from users. For instance, a community of users tag episodes or provide commentary that identifies dependencies among episodes of a series. Another example of a third party service includes a content provider pushing dependency information down to DVRs. An episode could be dependent upon all of the previous episodes or upon a portion of a single previous episode. Viewing behavior data is used to determine if there is a preference and/or tendency to view episodes of video series in order. Information about previously recorded content is also exampled to determine which previous episodes, if any, have already been viewed or acquired.

At block 205, the EPG and other download services are searched for availability of previous episodes. If a rebroadcast of a previous episode is indicated in the EPG, the DVR will schedule a recording of the rebroadcast. If the previous episode is available for download from a web service the DVR will initiate a download of the previous episode. A user can set various configurations for acquiring a video. For example, configurations can indicate whether recording or downloading is preferred. Configurations can also indicate whether a user is willing to pay for acquisition of an episode, and an acceptable price range(s). At block 207, previous episodes are recorded or downloaded.

Figure 3:
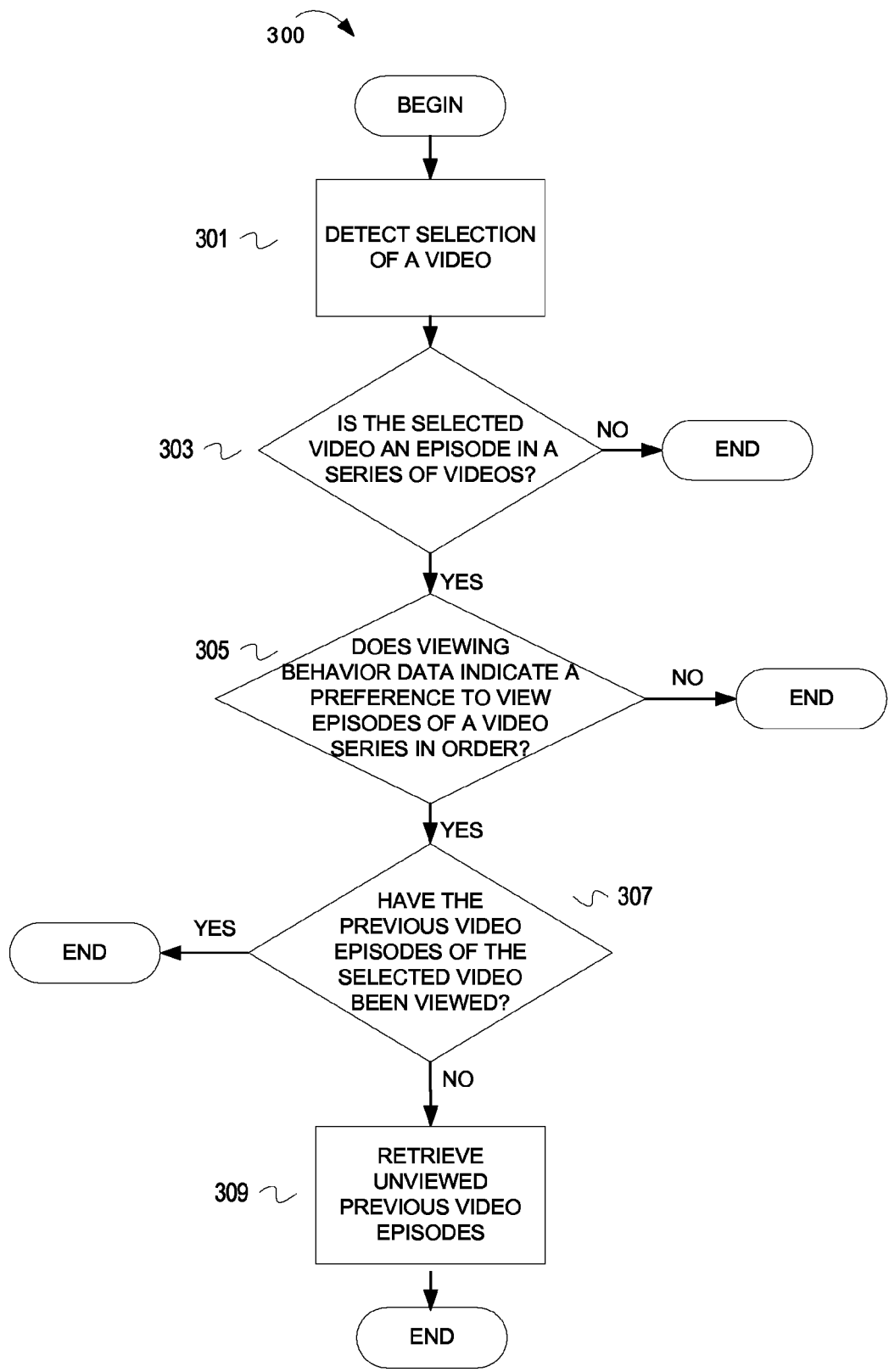
FIG. 3 depicts a flowchart of example operations to acquire previous episodes of a video series.

FIG. 3 depicts a flowchart of example operations to acquire previous episodes of a video series. Flow 300 begins at block 301, where selection of a video from a plurality of video content is detected. Examples of detecting selection of a video include detecting selection of a video for live television viewing, detecting changing live television channels, detecting scheduling of a new recording of a video, etc. At block 303, it is determined if the selected video is an episode in a video series. As an example, a DVR examines an electronic programming guide (EPG). As another example, the DVR accesses a video episode dependency service, which supplies data that indicates dependencies between episodes in a series. If the selected video is not part of a video series, the flow ends. If the selected video is part of a video series, then the flow continues to block 305.

At block 305, it is determined if viewing behavior data indicates a preference to view episodes of a series in order. Example techniques to determine if a viewing behavior data indicates a preference to view video series episodes in order include prompting a user to determine if he/she wants to watch the episodes in order, examining historical data that indicates prior viewing behavior of the video series (or other video series) to check if other episodes have been viewed out of order, etc. If it is determined that viewing behavior data does not indicate a preference to view episodes of a series in order, then the flow ends. If viewing behavior indicates that there is a preference to view the episodes of the series in order, the flow continues at block 307.

At block 307, it is determined if previous video episodes in the series have been viewed. To determine if a video episode has been viewed, a tracking mechanism (e.g., a database) is used to store prior viewing history. This viewing history data could be stored locally on the DVR and/or on a backend server at the content provider. If previous video episodes in the series have been viewed, the flow ends. If previous episodes have not been viewed, flow continues at block 309. At block 309, unviewed previous video episodes are retrieved and the flow ends. For example, these previous video episodes can be obtained by automatically scheduling recording of a rebroadcast. In another example, the previous episodes could be downloaded from a web service.

In some cases, it may not be necessary to acquire all of the previous episodes of a series. For example, episode 3 may be dependent on episode 1, but not episode 2 because episode 2 does not contain information relevant to the content (e.g., storyline) of episode 3. Therefore, only one of the two previous episodes will be acquired.

Figure 4:
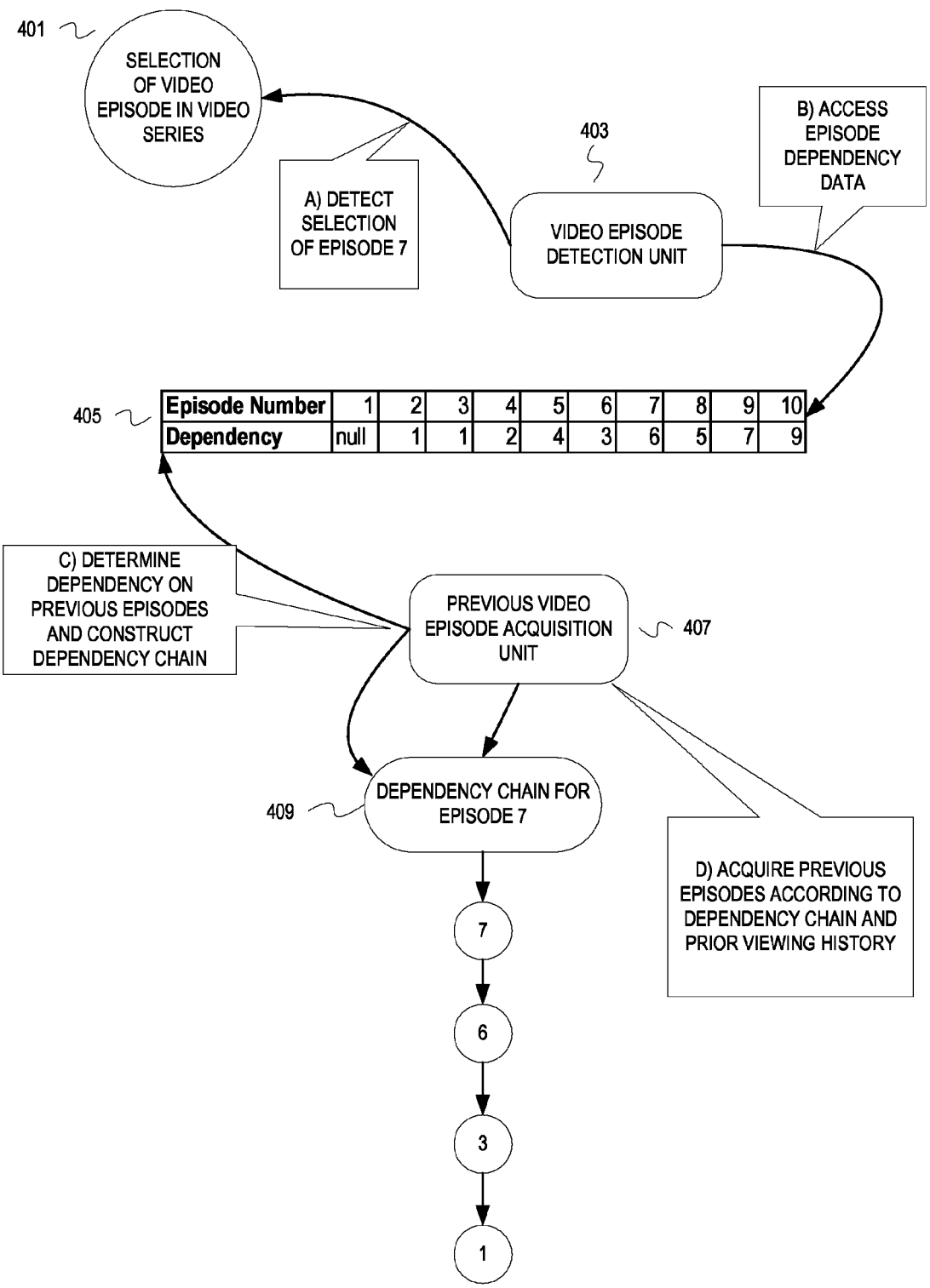
FIG. 4 depicts an example of a dependency matrix for a video series.

FIG. 4 depicts an example of a dependency matrix for a video series. At stage A, a video episode detection unit 403 examines a selection 401 of a video episode of a video series, and detects that episode 7 of the video series has been selected. At stage B, the video episode detection unit 403 accesses episode dependency data 405. The episode dependency data 405 can be obtained from the EPG, metadata associated with video episodes, data accessed over a network, and/or a third party cable service. The dependency data 405 can be every episode in the series that aired before the current selected episode or a subset of the previous episodes that are related to the content of the selected episode. At stage C, a previous video episode acquisition unit 407 determines which previous episodes the selected episode is dependent upon, and builds a dependency chain for episode 7. For example, the previous video episode acquisition unit 407 creates a structure that represents direct and indirect dependencies of episodes from episode 7 while walking the dependency data 405. In some cases, an episode may have more than one dependency chain. As an example, an episode can be dependent upon all of the regular previous episodes of the series or upon a special overview episode. The special overview episode recaps important storyline information from all of the regular previous episodes. The dependency chain indicating the special overview episode is more compact than the chain indicating all regular previous episodes. A user can set configurations with regard to preferred dependency chains. Examples include a user indicating a preference for compact dependency chains, a user indicating a preference for overview episodes, a user indicating a preference for minimal viewing time, etc. A unit or module (e.g., program product or application specific integrated circuit) can automatically request episodes and/or schedule recordings based on various parameters (e.g., total running time of videos in a dependency chain, number of nodes in a dependency chain, etc.). Dependency chain configurations can be applied differently to one or more series or the same to all series. Furthermore, embodiments can also utilize values along with indications of dependencies to indicate a particular quality of a video episode. For example, the special overview episode that recaps a previous season can be associated with a value that identifies it as a recap of the previous season. Embodiments can also associate episodes with values that represent priority and/or relevancy of the episodes. For example, the special overview episode can be given a higher value that suggests greater priority. The individual episodes of the previous season can also be associated with various values that represent their level of relevancy. Although a subject episode may be dependent upon eight episodes of the previous season, some of those previous episodes may only have marginal relevance with respect to a character who is killed off.

At stage D, the previous video episode acquisition unit 407 acquires the previous episodes based on the dependency chain and prior viewing history. Episodes that have not yet been viewed or recorded are acquired by the video acquisition unit 407.

Figure 5:
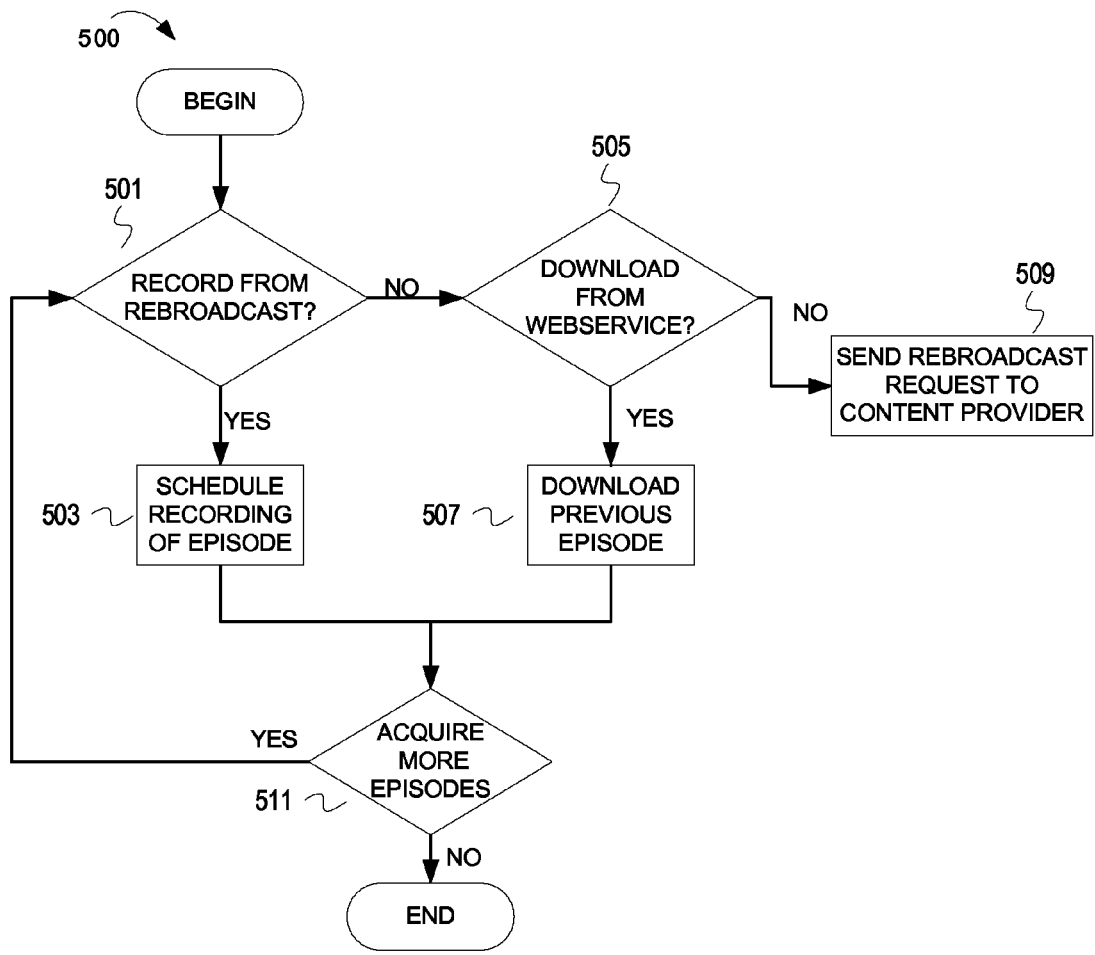
FIG. 5 is flowchart depicting example operations for acquiring previous video episodes of a series of video episodes by recording or downloading.

FIG. 5 is a flowchart depicting example operations for acquiring previous video episodes of a series of video episodes by recording or downloading. Flow 500 begins at block 501, where it is determined if a previous episode can be recorded from a rebroadcast of that episode. For example, a searching mechanism (e.g., implemented in the DVR and/or back-end service) searches an electronic programming guide for a rebroadcast of the previous episode. The electronic programming guide may not indicate a rebroadcast and/or the searching mechanism may limit searching within a given time period. If the previous episode can be recorded, then the flow continues at block 503. At block 503, the DVR schedules recording of the previous episode to be rebroadcast. Flow then continues at block 511.

If a rebroadcast of the previous episode is not or cannot be scheduled for recording, then flow continues at block 505. At block 505, it is determined if the episode can be downloaded from a web service. If the episode can be downloaded from a web service, flow continues to block 507. If the episode cannot be downloaded, flow continues to block 509.

At block 507, the previous episode is downloaded. Control flows from block 507 to block 511.

At block 509, a rebroadcast request is sent to the content provider.

At block 511, it is determined if there are more episodes to acquire. For example, episode 4 may depend on information from both episodes 1 and 3. As another example, episode 4 may depend on information in episode 3, which in turn depends on information in episode 2. If there are more episodes to acquire, flow returns to block 501. If there are no more episodes to acquire, the flow ends.

In block 509, a rebroadcast request is sent to the content provider when an episode cannot be recorded or downloaded. The content provider can use these requests to schedule re-runs of more popular episodes in a series. The number of requests for a specific episode can then be used by the content provider to determine advertising rates for the rebroadcast. Episodes that are more popular (i.e., those episodes with a large number of rebroadcast requests) can be scheduled for rebroadcast at prime times and with larger advertisement rates.

Figure 6:
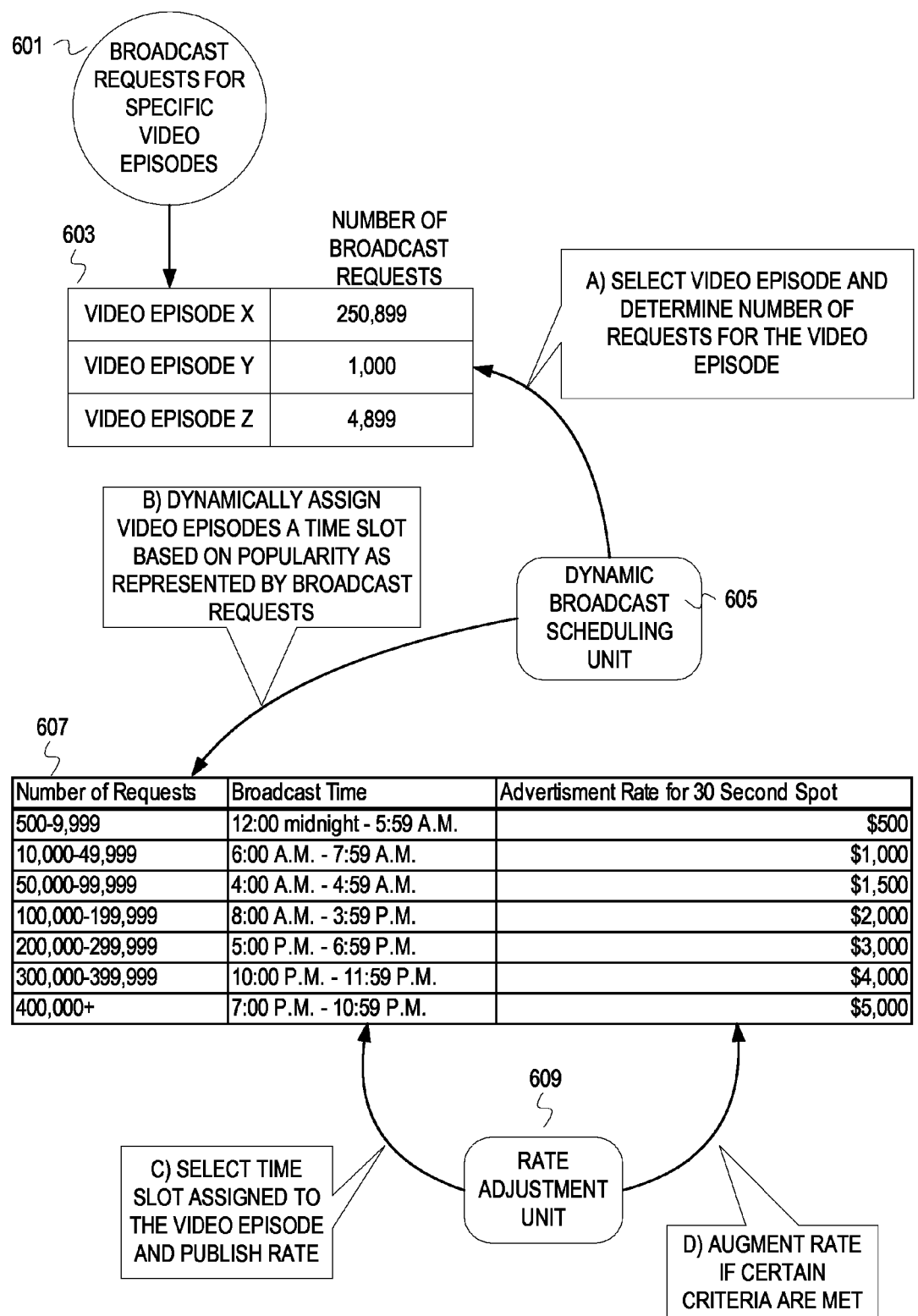
FIG. 6 is an example depiction of the use of rebroadcast requests by a content provider.

FIG. 6 is an example depiction of the use of broadcast requests by a content provider. A content provider receives requests 601 for broadcast of specific episodes. A table 603 indicates the requested episodes and corresponding number of broadcast requests for each episode. In this illustration, the table 603 indicates video episodes X, Y, and Z that have respectively accumulated 250,899 broadcast requests, 1000 broadcast requests, and 4899 broadcast requests. At stage A, a dynamic broadcast scheduling unit 605 determines the number of requests for a specific video episode. A table 607 is an example structure that associates popularity level as represented by ranges of broadcast requests, broadcast time slots, and advertisement rates for 30 second spots within each time slot. At stage B, the dynamic broadcast scheduling unit 605 schedules video episodes in time slots based on popularity level.

At stage C, a rate adjustment unit 609 selects the specific broadcast time slot for the video episode X within the time slot and publishes the advertising rate associated with that time slot. As an example, the rate adjustment unit 609 schedules a broadcast of an episode X at 5:00 p.m. In the table 607, the corresponding advertisement rate for a 30 second spot for broadcasts between 5:00 p.m. and 6:59 p.m. is $3000. The rate adjustment unit will publish a rate of $3000 for a 30 second advertisement during the broadcast of episode X.

At stage D, the rate adjustment unit 609 augments the rate if certain criteria are met. The rate may be augmented for a number of reasons. There may be more episodes that meet the popularity conditions for a specific time slot than can actually be aired within that time slot on any specific day. The content provider can handle this situation in various manners: decide to air episodes that do not fit into the specific day's time slot in the same time slot on another day; air the episodes in a different time slot the same day and augment the base rate for the chosen slot; etc. The content provider may also decide to accept bids for the most popular time slots based on, or completely independent of, the established rates. The content provider may utilize additional parameters to augment advertisement rates. For instance, there may be certain days of the week that are more popular for viewing than others. The content provider may choose to augment the base time slot rate based on more popular viewing days. In this example, broadcast requests for previous episodes of a video series automatically are sent to the content provider. In another example, requests for any previously aired video may be manually sent to the content provider. Embodiments can use various techniques allowing requests to be submitted and/or handled. Examples of techniques include encoding functionality within an electronic programming guide to submit requests for a video, providing an Internet browser to both search for videos and submit requests for the videos, etc. A user can submit requests for previously aired content or for content (e.g., a movie) that has never been aired.

Embodiments can broadcast the requested episodes on one or more channels available for general viewing as well as DVR recording. However, the content provider may choose to broadcast requested videos on a channel only accessible with a video recording device (e.g., DVR, game console, media center, etc.). The content provider can limit advertisements on the broadcast channel. For example, the content provider can require viewing of an advertisement before viewing the video and/or insert one or more advertisements at a halfway point in the video being broadcast. In addition, the content provided can encode the broadcast to prevent fast-forwarding and/or skipping.

Figure 7:
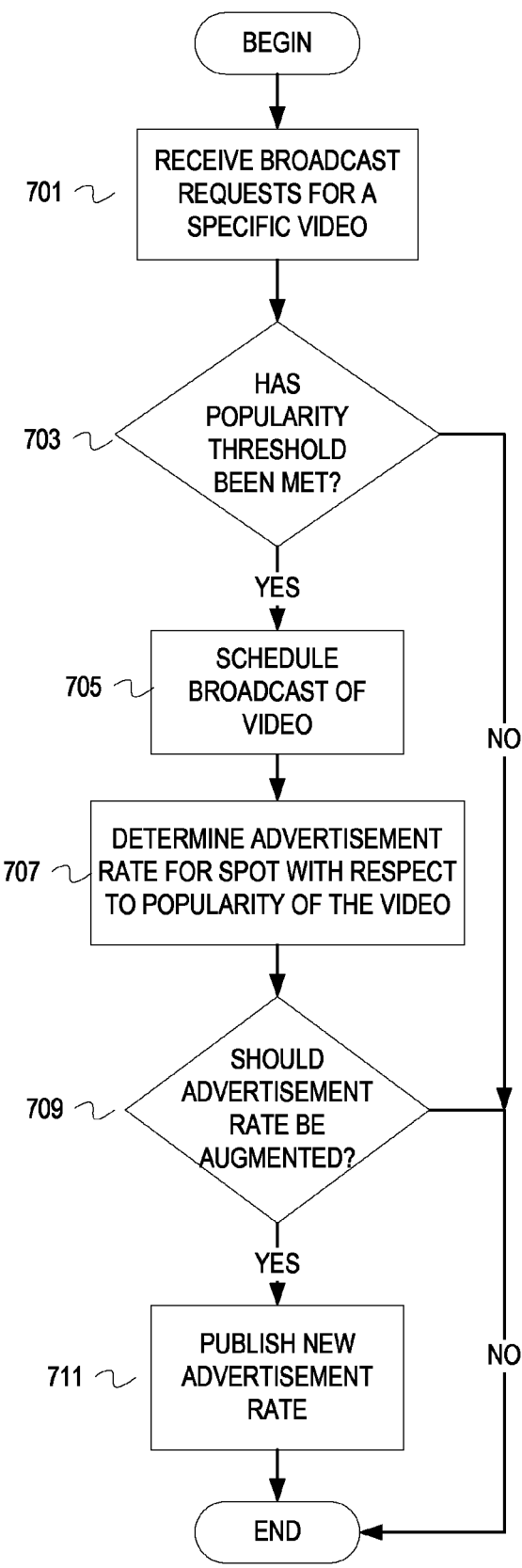
FIG. 7 is a flowchart depicting example operations for dynamically scheduling broadcasts and setting advertisement rates.

FIG. 7 is a flowchart depicting example operations for dynamically scheduling broadcasts and setting advertisement rates. Flow begins at block 701, where a content provider receives broadcast requests for a specific video. The requested video could be any previously aired content or new content that has not been aired.

At block 703, it is determined if the popularity threshold has been reached. To illustrate, a content provider can set the popularity threshold as a number of requests received for a specific video to be eligible for broadcast. If the popularity threshold has been met, then flow continues at block 705. If the popularity threshold has not been met, the flow ends.

At block 705, the video is scheduled for broadcast. Scheduling is in accordance with various parameters. For example, broadcast times are picked based on popularity as represented by the number or broadcast requests. At block 707, an advertisement rate for a spot with respect to popularity of the video is determined.

At block 709, it is determined if the advertisement rate should be augmented. The advertisement rate may be augmented based on a variety of parameters. Example parameters include more videos are eligible for a specific time slot than can be accommodated, the video is scheduled to be aired on a more popular day, advertisement space within the broadcast is filling up, etc. If the rate should be augmented, flow continues at block 711. If the rate should not be augmented, the flow ends.

At block 711, the new advertisement rate is published and the flow ends.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, operations in FIG. 3 for determining which previous episodes have been watched and determining to watch episodes in order could be interchanged. Referring to FIG. 4, a mechanism to track the subset of previous episodes that are helpful in viewing the selected episode may not be implemented. In this case, the selected episode would be considered to be dependent on all previous episodes.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
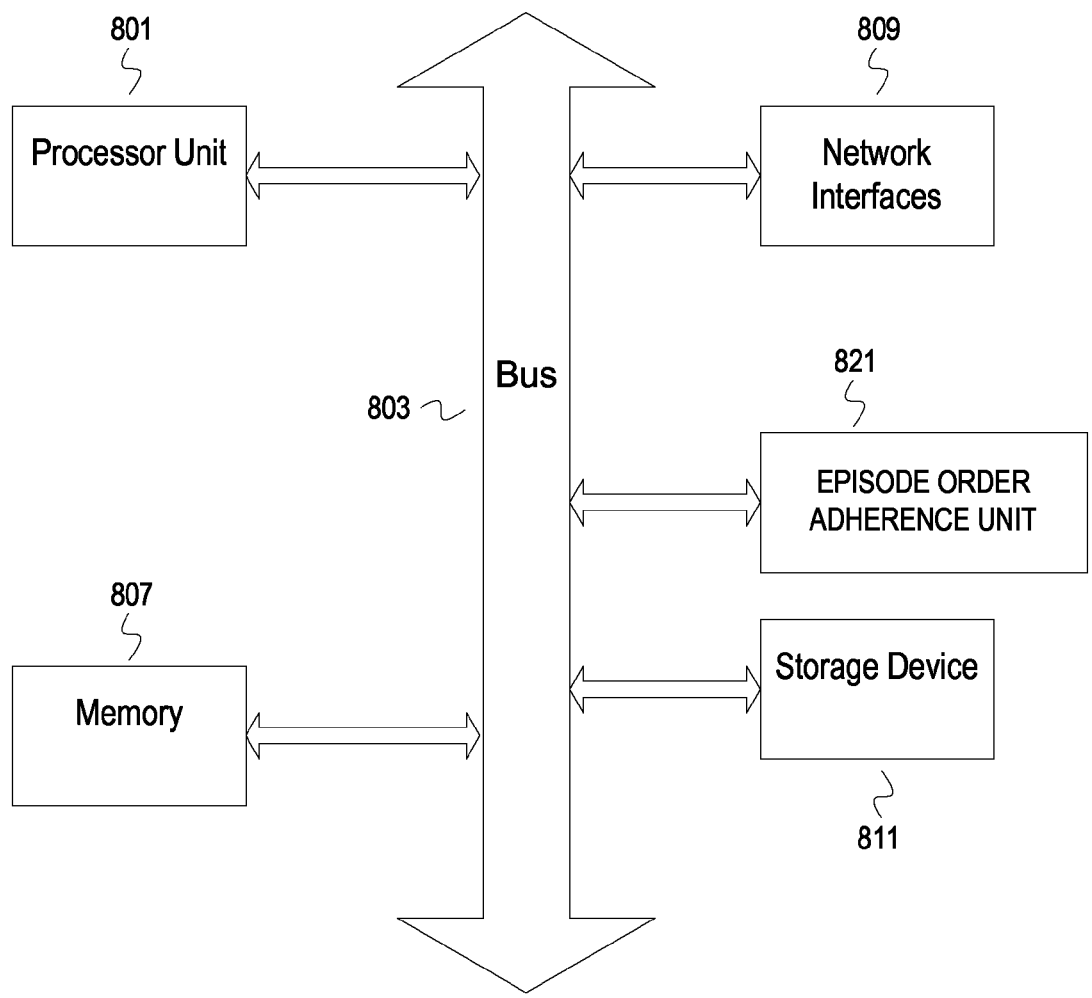
FIG. 8 depicts an example computer system.

FIG. 8 depicts an example computer system. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, InfiniBand®, NuBus, etc.), a network interface 809 (e.g., an ATM interface, an Ethernet interface, a Frame Relay interface, SONET interface, wireless interface, etc.), an episode order adherence unit 821, and a storage device(s) 811 (e.g., optical storage, magnetic storage, etc.). The episode order adherence unit 821 determines if a selected video is part of a series of videos and acquires one or more previous video episodes in the series. Some or all of the functionality of the episode order adherence unit 821 may be implemented with code embodied in memory and/or a processor, co-processors, other cards, etc. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 811, the episode order adherence unit 821, and the network interface 809 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for video episode order adherence, the method comprising the steps of:
   identifying, by a computer, a set of one or more video episodes in a series of videos, the set comprising less than all video episodes of the series, as having a dependency relationship with a selected video episode, wherein the identifying comprises: the computer determining that the selected video episode is a video episode in the series of videos,
   the computer requesting episode dependency information from a video episode dependency service in response to a determination that the selected video episode is a video episode in the series of videos, wherein
      the episode dependency information indicates that at least some subject matter of the selected video episode is dependent on subject matter of the set of one or more video episodes such that a viewer should watch the set of one or more video episodes to fully understand the content of the selected video episode, and
   the computer identifying the set of one or more video episodes utilizing the episode dependency information;
   the computer evaluating viewing behavior data of a viewer, wherein the viewer corresponds with the selected video episode;
   the computer determining that the viewing behavior data indicates a tendency to adhere to video series order based on the computer evaluating the viewing behavior data, wherein the computer determining that the viewing behavior data indicates the tendency to adhere to video series order comprises the computer determining that the viewing behavior data indicates viewing of videos having subject matter dependent upon preceding videos is done after viewing of the preceding videos;
   the computer searching an electronic programming guide for future broadcasts of the set of one or more video episodes responsive to the computer determining that the viewing behavior data indicates the tendency to adhere to video series order;
   the computer determining if the set of one or more video episodes are available for download from one or more services; and
   based on a configuration associated with the viewer, the computer requesting at least one of:
      downloading of some or all of the video episodes in the set of one or more video episodes from the one or more services, and
      scheduling for recording some or all of the video episodes in the set of one or more video episodes in accordance with said searching of the electronic programming guide for future broadcasts of the set of one or more video episodes.

2. The method of claim 1, wherein the configuration indicates conditions for requesting downloading of video episodes and scheduling recording of video episodes.

3. The method of claim 2 further comprising the computer determining one or more prices for downloading the set of one or more video episodes and an amount of time until each video episode of the set of one or more video episodes will be televised according to the electronic programming guide.

4. The method of claim 3 further comprising:
   the computer determining that a second episode in the set of one or more video episodes is scheduled to be televised beyond a threshold amount of time indicated in the configuration based, at least in part, on the amount of time until the second episode will be televised,
   wherein the requesting at least one of downloading some or all of the video episodes in the set of one or more video episodes from the one or more services and scheduling for recording some or all of the video episodes in the set of one or more video episodes comprises the computer requesting scheduling for recording a first episode in the set of one or more video episodes and requesting downloading of the second episode from a first of the one or more services.

5. The method of claim 1, wherein said identifying the set of one or more video episodes in a series of videos comprises accessing a dependency matrix of video episodes in the video series.

6. The method of claim 1, wherein said identifying comprises accessing a database over a network, wherein the database indicates dependencies between the video episodes in the video series.

7. The method of claim 6 further comprising the computer generating a structure that indicates a chain of dependencies among the video episodes in the video series.

8. The method of claim 1, wherein the computer comprises one of a digital video recorder, a gaming console, a personal video recorder, and a server.

9. The method of claim 1 further comprising the computer determining that the set of one or more video episodes have not previously been viewed by the viewer or acquired for the viewer to view.

10. A computer program product for video episode order adherence, the computer program product comprising:
one or more computer-readable, tangible storage devices;
program instructions, stored on at least one of the one or more storage devices, to identify a set of one or more video episodes in a series of videos, the set comprising less than all video episodes of the series, as having a dependency relationship with a selected video episode, wherein the program instructions to identify comprise program instructions to:
determine that the selected video episode is a video episode in the series of videos,
request episode dependency information from a video episode dependency service in response to a determination that the selected video episode is a video episode in the series of videos, wherein
the episode dependency information indicates that at least some subject matter of the selected video episode is dependent on subject matter of the set of one or more video episodes such that a viewer should watch the set of one or more video episodes to fully understand the content of the selected video episode, and
identify the set of one or more video episodes utilizing the episode dependency information;
program instructions, stored on at least one of the one or more storage devices, to evaluate viewing behavior data of a viewer, wherein the program instructions to evaluate the viewing behavior data of the viewer comprises the program instructions to determine that the viewing behavior data indicates a tendency of the viewer to adhere to viewing of videos having subject matter dependent upon preceding videos after viewing of the preceding videos;
program instructions, stored on at least one of the one or more storage devices, to search an electronic programming guide for future broadcasts of the set of one or more video episodes if the viewing behavior data indicates a tendency to adhere to video series order;
program instructions, stored on at least one of the one or more storage devices, to determine if the set of one or more video episodes are available for download from one or more services;
program instructions, stored on at least one of the one or more storage devices, to request, based on configuration data of a computer, at least one of
downloading of some or all of the video episodes in the set of one or more video episodes from the one or more services to the computer and
scheduling for recording some or all of the video episodes in the set of one or more video episodes to the computer in accordance with of the electronic programming guide.

11. The computer program product of claim 10, wherein the configuration data indicates conditions for the program instructions to request downloading of video episodes and scheduling recording of video episodes.

12. The computer program product of claim 11, further comprising program instructions, stored on at least one of the one or more storage devices, to determine one or more prices for downloading the set of one or more video episodes and an amount of time until each video episode in the set of one or more video episodes will be televised according to the electronic programming guide.

13. The computer program product of claim 12 further comprising:
program instructions, stored on at least one of the one or more storage devices, to determine that a second episode in the set of one or more video episodes is scheduled to be televised beyond a threshold amount of time indicated in the configuration data based, at least in part, on the amount of time until the second episode will be televised,
wherein the program instructions to request at least one of downloading some or all of the video episodes in the set of one or more video episodes from the one or more services to the computer and scheduling for recording some or all of the video episodes in the set of one or more video episodes to the computer comprise program instructions to request scheduling for recording a first episode in the set of one or more video episodes to the computer and to request downloading, from a first service of the one or more services, the second of the one or more episodes.

14. The computer program product of claim 10, wherein the program instructions to identify comprise program instructions to access a dependency matrix of video episodes in the video series.

15. The computer program product of claim 10, wherein the program instructions to identify comprise program instructions to access a database over a network, wherein the database indicates dependencies between the video episodes in the video series.

16. The computer program product of claim 10, further comprising program instructions to determine whether the set of one or more video episodes have already been viewed by the viewer or have already been acquired for the viewer, before searching the electronic programming guide and before determining if the set of one or more video episodes are available for download from one or more services.

17. The computer program product of claim 10, further comprising program instructions to dynamically schedule a rebroadcast of a first episode in the set of one or more video episodes based on requests for the first episode from a plurality of users.

18. The computer program product of claim 17, further comprising program instructions to determine that the first episode of the set of one or more video episodes is associated with a value that represents one of greater priority and greater relevancy than other episodes of the series of videos.

19. An apparatus for video episode order adherence, the apparatus comprising:

one or more processors, one or more computer-readable memories and one or more computer-readable, tangible storage devices;

program instructions, stored on at least one of the one or more storage devices for execution by at least one of the one or more processors via at least one of the one or more memories, to identify a set of one or more video episodes in a series of videos, the set comprising less than all video episodes of the series, as having a dependency relationship with a selected video episode, wherein the program instructions to identify comprise program instructions to determine that the selected video episode is a video episode in the series of videos, request episode dependency information from a video episode dependency service in response to a determination that the selected video episode is a video episode in the series of videos, wherein the episode dependency information indicates that at least some subject matter of the selected video episode is dependent on subject matter of the set of one or more video episodes such that a viewer should watch the set of one or more video episodes to fully understand the content of the selected video episode, and identify the set of one or more video episodes utilizing the episode dependency information;

program instructions, stored on at least one of the one or more storage devices for execution by at least one of the one or more processors via at least one of the one or more memories, to evaluate viewing behavior data of a viewer, wherein the program instructions to evaluate the viewing behavior data of the viewer comprises the program instructions to determine that the viewing behavior data indicates a tendency of the viewer to adhere to viewing of videos having subject matter dependent upon preceding videos after viewing of the preceding videos;

program instructions, stored on at least one of the one or more storage devices for execution by at least one of the one or more processors via at least one of the one or more memories, to search an electronic programming guide for future broadcasts of the set of one or more video episodes if the viewing behavior data indicates a tendency to adhere to video series order;

program instructions, stored on at least one of the one or more storage devices for execution by at least one of the one or more processors via at least one of the one or more memories, to determine if the set of one or more video episodes are available for download from one or more services;

program instructions, stored on at least one of the one or more storage devices for execution by at least one of the one or more processors via at least one of the one or more memories, to request, based on configuration data, at least one of downloading of some or all of the video episodes in the set of one or more video episodes from the one or more services and scheduling for recording some or all of the video episodes in the set of one or more video episodes in accordance with the electronic programming guide.

20. The apparatus of claim 19, wherein at least one of the one or more computer-readable, tangible storage devices hosts data about video episodes and video series.

* * * * *